United States Patent
De Angelis

[15] 3,698,683
[45] Oct. 17, 1972

[54] VALVE FOR LABORATORY GLASSWARE

[72] Inventor: William M. De Angelis, Wilton, Conn.

[73] Assignee: Daran Products, Inc., Norwalk, Conn.

[22] Filed: June 23, 1970

[21] Appl. No.: 49,085

[52] U.S. Cl..................................251/209, 251/309
[51] Int. Cl................................................F16k 5/04
[58] Field of Search...............251/188, 209, 309, 155

[56] References Cited

UNITED STATES PATENTS

| | | | |
|---|---|---|---|
| 3,142,474 | 7/1964 | Nelson | 251/309 |
| 3,305,211 | 2/1967 | Phillips | 251/209 X |
| 3,475,002 | 9/1969 | Phillips | 251/209 X |

*Primary Examiner*—Harold W. Weakley
*Attorney*—S. E. Rockwell and S. P. Tedesco

[57] ABSTRACT

A valve including a tapered glass barrel having a fluid inlet and an outlet in the wall structure thereof, receiving a rotary fluorocarbon or equivalent plug having a handle portion by which it may be turned in the barrel on its axis, having a complementally tapered portion; the plug, or the plug and the barrel together, defining a fluid passageway between the inlet and outlet when the plug is in an angularly adjusted position thereof. The construction and arrangement of the elements may be such that flow of a liquid through the valve may be visually observed. The plug, which is formed of deformable material, is provided with an axial recess within the portion thereof which is received in the barrel and opening through the smaller tapered end of the plug, providing a relatively thin-walled portion of the plug. An elastomer insert is provided in the recess and a fastener unit is provided to maintain the elements in assembled position which unit comprises a threaded shank which in assembled position is secured to the plug extending axially thereof. The fastener unit also comprises a member co-acting with the shank, overlying the end of the barrel opposite the handle portion of the plug to prevent, with the taper of the barrel and the plug, axial dislocation of the plug. The last-named fastener member is provided with an axial extension to contact and compress the elastomer insert to force it radially against the axial wall of the aforementioned plug recess, thereby expanding the plug in an axial region thereof, which is relatively flexible, to form a tight fluid seal between the plug and the barrel. The plug has frictional contact with the barrel only over a portion of that part of the plug which is received in the barrel, so as to reduce resistance to turning of the plug in the barrel by the handle portion.

11 Claims, 4 Drawing Figures

PATENTED OCT 17 1972

3,698,683

INVENTOR.
William M. DeAngelis
BY Stephen E. Rockwell
ATTORNEY

VALVE FOR LABORATORY GLASSWARE

BACKGROUND OF THE INVENTION

1. Field of the Invention

This invention relates to valves of the type employed in laboratory glassware, for example, for interconnecting two or more fluid conduits.

2. Prior Art

Valves for use with laboratory glassware are well known. The earliest valves were all glass. However, in more recent years valves have been developed which utilize a glass barrel with a plastic plug, usually of a synthetic resin of the fluorocarbon type, such as tetrafluoroethylene. Such valves have advantages over all-glass valves. However, they also have certain disadvantages. There have, for example been difficulties with sealing and with friction. It is common to use a tensioning nut to draw the plastic plug deeper into the tapered barrel. However, the cold flow properties of the resin make it tend to elongate and thereby reduce the sealing effect. One approach which has been proposed for solving these problems makes use of a cylindrical, rather than a tapered, barrel. The plastic plug is quite elongated and is filled with granular rubber which is compressed by a compression insert. This forces the plug into tighter engagement with the barrel, improving the seal. However, the cylindrical construction has a number of problems including the requirement for ribs to provide sealing and to reduce the friction. In addition, the prior art valves tend to be somewhat complex and to have more parts than is desirable.

SUMMARY OF THE INVENTION

Accordingly, it is an object of the present invention to provide a valve for laboratory glassware which is extremely compact, has very few parts, provides an effective seal with reduced turning friction, and wherein liquid flow may be visible. Other objects, features, and advantages will be apparent from the following description.

There is provided a valve for laboratory glassware including a glass barrel having a conically tapered, smooth, inner surface and two integral side arms, each defining a fluid passage communicating with the interior of the barrel. A plastic plug is rotatably positioned within the barrel with at least a portion of its outer surface bearing against the inner surface of the barrel and having a matching taper. The outer surface of the plug defines a partially circumferential groove which is positioned axially of the plug to interconnect in an angular position of the plug the fluid passages. The plug also includes a handle portion which extends from its large-diameter end and one of the barrel, and an axial recess which extends inwardly from its small-diameter end. An annular, elastomeric insert is positioned in the recess. A fastener unit is provided to maintain the valve elements in assembled condition, which includes a member abutting the other end of the barrel and a threaded shank with which it cooperates and which is secured in the plug, the last-mentioned member being threadedly adjustable in and out and having a portion thereof for compressing the insert, thereby expanding the plug against the inner surface of the barrel to provide a fluid seal.

DESCRIPTION OF THE PREFERRED EMBODIMENTS

Figure 1:
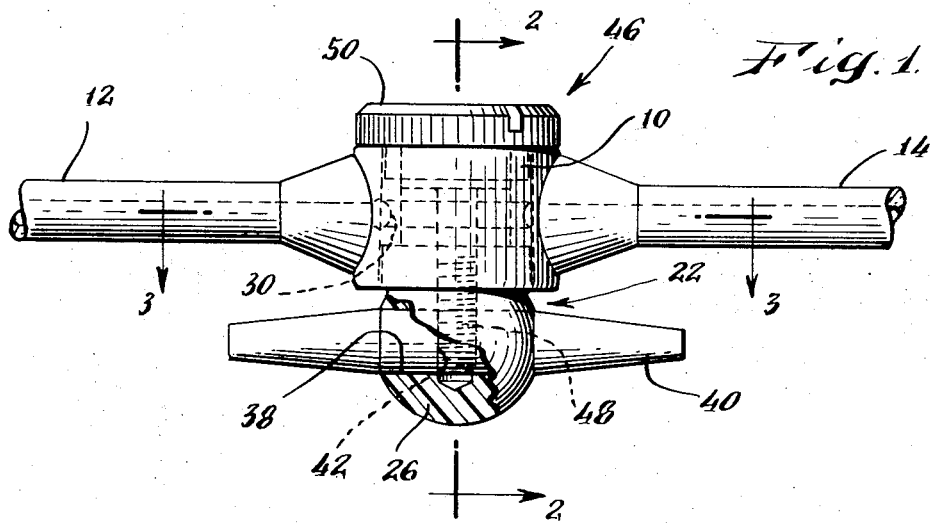
FIG. 1 is a side elevational view of a valve of this invention, a portion thereof being broken away to illustrate its construction.
Figure 2:
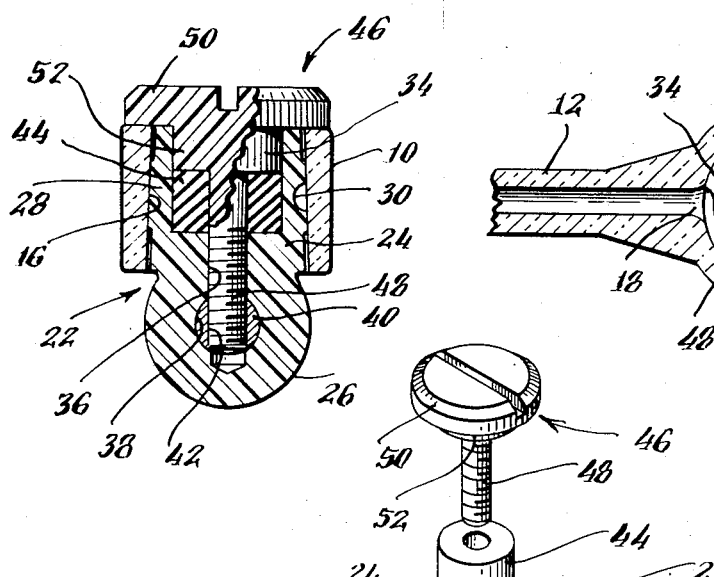
FIG. 2 is a cross-sectional view taken substantially along the line 2—2 of FIG. 1.

The illustrated valve comprises a glass barrel 10 shown by way of example with diametrically extending tubular side arms 12, 14. The inner surface 16 of barrel 10 is slightly tapered as seen in FIG. 2 and defines ports 18, 20 which communicate with each of the tubular side arms, as will be most apparent from FIG. 3. The rotary valve member 22 comprises a tapered plug 24 conforming to the taper of inner surface 16 and having an external handle-receiving portion 26 which, in the illustrated embodiment, is generally spherical. The extremities of the portion of the plug 24 received in the barrel are cut away, as illustrated in FIGS. 2 and 4, leaving a relatively narrow central portion 28 in direct frictional engagement with the inner surface 16 of the barrel. The central portion 28 defines a groove 30 which extends circumferentially partially around the plug 24 to provide communication between the ports 18, 20 in an angularly adjusted position of the plug, the fluid channel between the ports 18, 20 being defined by the plug and the barrel in the form shown by way of example.

In the illustrated embodiment, one end of groove 30 terminates in a V-shaped portion 32. Internally of plug 24 there is formed a cylindrical recess 34 which extends axially inwardly from the small-diameter end, forming a relatively thin-walled portion of the plug which has some degree of flexibility. From the bottom of the recess 34, as seen in FIG. 2, there extends a smaller diameter axial bore 36 which intersects a radial bore 38 extending through handle-receiving portion 26.

Positioned removably in radial bore 38 is an elongated, pin-type handle 40 having a tapped opening 42 extending transversely therethrough and alignable with axial bore 36. An elastomeric annular insert 44 is snugly positioned with recess 34. The illustrated assembly is completed by a screw fastener unit 46 having an elongated shank 48 which threadedly engages handle 40, and enlarged head 50 which overlies the end of barrel 10, and a compression shoulder 52 which lies within recess 34 in contact with insert 44.

The handle 40 and fastener unit 46 may be formed of any suitable, relatively rigid materials such as metal or a suitable plastic. The plug 22 is preferably formed from an inert plastic such as a fluorocarbon having cold flow properties, which might be polytetrafluoroethylene or fluorinated ethylene propylene. The insert 44 is an elastomer such as rubber, or a plastic having rubber-like qualities.

The valve is assembled by inserting handle 40 into handle receiving portion 26 and inserting plug 22 into barrel 10. Due to the tapered configuration, the insertion can be made from only one end of the barrel, from the bottom as seen in FIG. 2. The insert 44 is positioned in recess 34 and the shank of screw 46 is pushed through the insert 44 which receives it snugly, and threaded into the opening 42 of handle 40. As the screw is tightened, the compression shoulder 52 compresses the elastomeric insert 44 to expand it radially, which exerts radial pressure against plug 24, forcing its relatively flexible central portion 28 into sealing engagement with the inner surface 16 of barrel 10. This tends to insure against fluid leakage but the relatively narrow width of central portion 28 also prevents undue friction and permits easy rotation of the plug without requiring the use of lubricants. It will also be apparent from FIG. 2 that the plug is completely axially restrained. The taper prevents upward movement and the screw head 50 prevents downward movement.

An alternative construction to that shown, which does not necessitate illustration, might comprise a two-part fastener unit instead of the one-piece unit 46. The handle portion 26 and the handle 40 of the plug may be structured so as to constitute one piece. The fastener shank could be secured to the plug, perhaps permanently as an integral part thereof, in any suitable manner and have a threaded part extending beyond the walled portion of the plug to receive thereon a nut overlying and co-acting with the appropriate end of the barrel. The nut could have an axial extension to contact and compress the elastomer insert 44 to the desired degree to form the aforementioned fluid seal by the selected adjustment of the nut on the threaded shank. It will be apparent from the foregoing that the illustrated fastener unit 46 may be threadedly adjusted to provide the desired sealing effect between the plug and the barrel.

Figure 3:
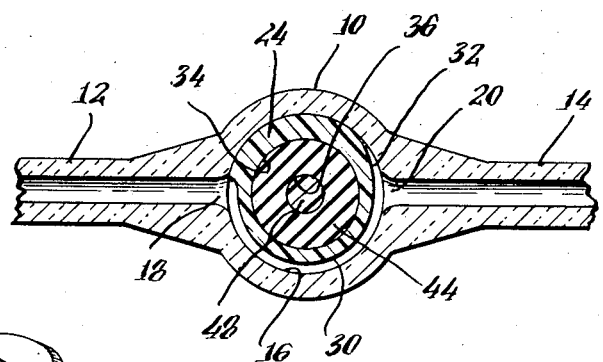
FIG. 3 is a cross-sectional view taken substantially along the line 3—3 of FIG. 1.
Figure 4:
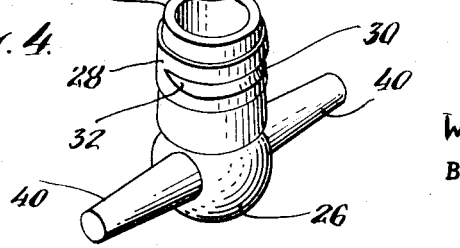
FIG. 4 is a partially exploded perspective view of the rotatable portion of the valve.

With the plug in the illustrated angular position, it will be seen from FIG. 3 that there is direct communication between the ports 18, 20. Furthermore, the fluid is contained against the glass wall of barrel 10 and is readily observable. A slight rotation of the plug counterclockwise, as viewed in FIG. 3, will close off port 18, stopping all flow. The opposite end of groove 30 terminates in the optional V-shaped portion 32. Slight rotation in the clockwise direction, as viewed in FIG. 3, reduces the effective cross-section of the groove 30, thereby permitting the valve to function as a metering valve. When the plug is rotated so that the ports 18, 20 are out of communication with one another, the groove 30 in the plug is self-draining.

It will now be apparent that the valve of this invention is extremely compact and has very few parts. However, all the objectives heretofore set forth are met in that the valve tends to be fluid tight and has low frictional resistance to turning. It will also be apparent to those skilled in the art that a number of variations and modifications may be made in this invention without departing from its spirit and scope. Accordingly, the foregoing description is to be construed as illustrative only rather than limiting. This invention is limited only by the scope of the following claims.

What is claimed is:

1. A valve for laboratory glassware comprising: a glass barrel having a conically tapered, smooth, inner surface portion so as to provide a larger inner diameter in proximity to one end of the barrel, at least two side arms integral with said barrel, each defining a fluid passage communicating with the interior of the barrel, an inert, deformable plastic plug received through said one end of the barrel and rotatable within the barrel, having at least a portion of its outer surface bearing against said inner surface portion and having a complimental taper, said outer surface portion of the plug defining a groove extending partially around the circumference thereof to interconnect said fluid passageways in an angularly adjusted position of the plug, said plug at one end including a handle portion extending from said one end of the barrel, and said plug defining an axial recess extending into the other end of the plug to provide a relatively thin-walled flexible part in the area of said outer surface portion, an annular elastomeric insert received in said recess, and fastener means to retain the elements in assembled condition including a member overlying and coacting with the other barrel end and coacting with a shank in secured relation to the plug in an axial relationship thereto and extending through said insert, said member having associated therewith a compression part engageable with said insert and being adjustable in and out axially of the plug to vary the compression of the insert, said insert on compression expanding said walled portion of the plug into fluid sealing engagement with the barrel.

2. A valve as defined in claim 1, wherein said member of the fastener unit is threadedly adjustable axially of the plug.

3. A valve as defined in claim 1, wherein said member of the fastener unit is angularly fixed to said shank and the latter is threaded into a part in fixed relation to the plug.

4. A valve as defined in claim 1, including a separable handle of elongated form extending into a bore in said plug handle portion extending transversely of the plug axis, the handle having a threaded transverse bore, said member of the fastener unit being angularly fixed to said shank, and the latter being threaded into said bore in the handle.

5. A valve as defined in claim 1, wherein the outer surface bearing portion of the plug has a substantially smaller area than the inner surface of the barrel.

6. A valve as defined in claim 1 wherein the outer surface bearing portion of the plug has a substantially smaller bearing area than said tapered inner surface portion of the barrel.

7. A valve as defined in claim 1, wherein said plug groove includes at least one metering portion in which the cross-sectional area of the groove varies with the groove length.

8. A valve as defined in claim 1, wherein said plug recess is substantially cylindrical.

9. A valve as defined in claim 5, wherein said outer surface bearing portion of the plug is substantially midway between the barrel ends.

10. A valve as defined in claim 7, wherein said metering portion comprises a tapered end of said groove.

11. A valve for laboratory glassware comprising, a glass barrel having a conically tapered, smooth, inner surface portion so as to provide a larger inner diameter in proximity to one end of the barrel, at least two side arms integral with said barrel, each defining a fluid passage communicating with the interior of the barrel, an inert, deformable plastic plug received through said one end of the barrel and rotatable within the barrel, having at least the portion of its outer surface bearing against said inner surface portion and having a complemental taper, the plug having means defining a fluid channel therein to interconnect said fluid passageways in an angularly adjusted position of the plug, said plug at one end including a handle portion extending from said one end of the barrel, and said plug defining an axial recess extending into the other end of the plug to provide a relatively thin-walled flexible portion in the area of said outer surface portion, an annular elastomeric insert snugly received in said recess, and a screw including a threaded elongated shank extending through said insert and threaded into a part in a fixed relation to said handle portion, said screw having an enlarged head coacting with the other end of said barrel and carrying a compression part engageable with said insert, said insert on compression expanding said flexible wall portion of the plug into sealing engagement with the barrel.

* * * * *